United States Patent
Marr et al.

(10) Patent No.: US 9,686,078 B1
(45) Date of Patent: Jun. 20, 2017

(54) FIRMWARE VALIDATION FROM AN EXTERNAL CHANNEL

(71) Applicant: Amazon Technologies, Inc., Seattle, WA (US)

(72) Inventors: Michael David Marr, Monroe, WA (US); Pradeep Vincent, Issaquah, WA (US); Matthew T. Corddry, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/635,923

(22) Filed: Mar. 2, 2015

Related U.S. Application Data

(63) Continuation of application No. 12/555,436, filed on Sep. 8, 2009, now Pat. No. 8,971,538.

(51) Int. Cl.
*H04L 29/06* (2006.01)
*H04L 9/32* (2006.01)
*G06F 9/445* (2006.01)
*H04L 29/08* (2006.01)
*H04L 9/30* (2006.01)

(52) U.S. Cl.
CPC .............. *H04L 9/3236* (2013.01); *G06F 8/65* (2013.01); *H04L 9/30* (2013.01); *H04L 67/34* (2013.01)

(58) Field of Classification Search
CPC .......... G06F 8/65; G06F 21/572; G06F 21/60; H04L 67/34
See application file for complete search history.

(56) References Cited

U.S. PATENT DOCUMENTS

| | | |
|---|---|---|
| 4,939,382 A | 7/1990 | Gruodis |
| 5,530,753 A | 6/1996 | Easter et al. |
| 5,539,736 A | 7/1996 | Johnson et al. |
| 5,799,086 A | 8/1998 | Sudia |
| 5,819,087 A | 10/1998 | Le et al. |
| 5,878,256 A | 3/1999 | Bealkowski et al. |
| 5,920,705 A | 7/1999 | Lyon et al. |
| 5,937,169 A | 8/1999 | Connery et al. |
| 6,009,274 A | 12/1999 | Fletcher et al. |
| 6,301,229 B1 | 10/2001 | Araujo et al. |

(Continued)

OTHER PUBLICATIONS

U.S. Appl. No. 12/554,690, filed Sep. 4, 2009, Titled: Firmware Updates From an External Channel.

(Continued)

*Primary Examiner* — Dao Ho
(74) *Attorney, Agent, or Firm* — Kilpatrick Townsend & Stockton LLP

(57) ABSTRACT

The state of firmware for devices on a provisioned host machine can be validated independent of the host CPU(s) or other components exposed to the user. A port that is not fully exposed or accessible to the user can be used to perform a validation process on firmware without accessing a CPU of the host device. The firmware can be scanned and a hashing or similar algorithm can be used to determine validation information, such as hash values, for the firmware, which can be compared to validation information stored in a secure location. If the current and stored validation information do not match, one or more remedial actions can be taken to address the firmware being in an unknown or unintended state.

18 Claims, 7 Drawing Sheets

(56) References Cited

U.S. PATENT DOCUMENTS

| | | |
|---|---|---|
| 6,385,727 B1 | 5/2002 | Cassagnol et al. |
| 6,615,349 B1 | 9/2003 | Hair |
| 6,665,725 B1 | 12/2003 | Dietz et al. |
| 6,879,587 B1 | 4/2005 | Yadav et al. |
| 6,944,854 B2 | 9/2005 | Kehne et al. |
| 6,957,328 B2 | 10/2005 | Goodman et al. |
| 6,961,791 B2 | 11/2005 | Cepulis |
| 7,031,297 B1 | 4/2006 | Shabtay et al. |
| 7,031,322 B1 | 4/2006 | Matsuo |
| 7,055,148 B2 | 5/2006 | Marsh et al. |
| 7,136,384 B1 | 11/2006 | Wang et al. |
| 7,251,745 B2 | 7/2007 | Koch et al. |
| 7,260,650 B1 | 8/2007 | Lueckenhoff |
| 7,266,595 B1 | 9/2007 | Black et al. |
| 7,293,129 B2 | 11/2007 | Johnsen et al. |
| 7,299,294 B1 | 11/2007 | Bruck et al. |
| 7,305,668 B2 | 12/2007 | Kennedy et al. |
| 7,305,711 B2 | 12/2007 | Ellison et al. |
| 7,350,083 B2 | 3/2008 | Wells et al. |
| 7,376,125 B1 | 5/2008 | Millet et al. |
| 7,406,518 B2 | 7/2008 | Lasserre |
| 7,421,533 B2 | 9/2008 | Zimmer et al. |
| 7,447,777 B1 | 11/2008 | Singh Ahuja et al. |
| 7,506,149 B2 | 3/2009 | Rothman et al. |
| 7,512,612 B1 | 3/2009 | Akella et al. |
| 7,512,684 B2 | 3/2009 | Ronciak et al. |
| 7,526,516 B1 | 4/2009 | Pavlyushchik et al. |
| 7,586,936 B2 | 9/2009 | Arimilli et al. |
| 7,613,847 B2 | 11/2009 | Kjos et al. |
| 7,616,615 B2 | 11/2009 | Sueyoshi et al. |
| 7,630,368 B2 | 12/2009 | Tripathi et al. |
| 7,730,295 B1 | 6/2010 | Lee et al. |
| 7,739,422 B2 | 6/2010 | Hua et al. |
| 7,739,487 B2 | 6/2010 | Mylly et al. |
| 7,793,091 B2 | 9/2010 | Weikel et al. |
| 7,796,646 B2 * | 9/2010 | Das ..................... G06F 9/5077 370/464 |
| 7,802,000 B1 | 9/2010 | Huang et al. |
| 7,836,226 B2 | 11/2010 | Zappe et al. |
| 7,869,428 B2 | 1/2011 | Shake et al. |
| 7,904,518 B2 | 3/2011 | Marino et al. |
| 8,102,881 B1 | 1/2012 | Vincent |
| 8,155,146 B1 | 4/2012 | Vincent et al. |
| 8,191,065 B2 | 5/2012 | Frank et al. |
| 8,205,194 B2 | 6/2012 | Fries et al. |
| 8,214,653 B1 | 7/2012 | Marr et al. |
| 8,229,939 B2 | 7/2012 | Staddon et al. |
| 8,230,155 B2 | 7/2012 | Oshins et al. |
| 8,274,518 B2 | 9/2012 | Blythe et al. |
| 8,300,641 B1 | 10/2012 | Vincent et al. |
| 8,312,263 B2 | 11/2012 | Bell et al. |
| 8,381,264 B1 | 2/2013 | Corddry et al. |
| 8,428,087 B1 | 4/2013 | Vincent et al. |
| 8,462,780 B2 | 6/2013 | Vincent et al. |
| 8,483,221 B1 | 7/2013 | Vincent et al. |
| 8,601,170 B1 | 12/2013 | Corddry et al. |
| 8,640,220 B1 | 1/2014 | Marr et al. |
| 8,774,213 B2 | 7/2014 | McKelvie et al. |
| 8,806,576 B1 | 8/2014 | De Santis et al. |
| 8,830,887 B2 | 9/2014 | Cordeiro et al. |
| 8,887,144 B1 | 11/2014 | Corddry et al. |
| 8,942,236 B1 | 1/2015 | Marr et al. |
| 8,959,611 B1 | 2/2015 | Marr et al. |
| 8,971,538 B1 | 3/2015 | Marr et al. |
| 8,996,744 B1 | 3/2015 | Marr et al. |
| 9,042,403 B1 | 5/2015 | Vincent et al. |
| 2001/0044934 A1 | 11/2001 | Hirai et al. |
| 2002/0073304 A1 | 6/2002 | Marsh et al. |
| 2002/0080784 A1 | 6/2002 | Krumel et al. |
| 2002/0091807 A1 | 7/2002 | Goodman et al. |
| 2002/0092008 A1 | 7/2002 | Kehne et al. |
| 2002/0104006 A1 | 8/2002 | Boate et al. |
| 2002/0150243 A1 | 10/2002 | Craft et al. |
| 2002/0157011 A1 | 10/2002 | Thomas, III et al. |
| 2003/0005276 A1 | 1/2003 | French et al. |
| 2003/0014626 A1 | 1/2003 | Poeluev et al. |
| 2003/0023966 A1 | 1/2003 | Shimizu et al. |
| 2003/0058860 A1 | 3/2003 | Kunze et al. |
| 2003/0074657 A1 | 4/2003 | Bramley |
| 2003/0115471 A1 | 6/2003 | Skeba et al. |
| 2003/0185207 A1 | 10/2003 | Nakahara |
| 2003/0188176 A1 | 10/2003 | Abbondanzio et al. |
| 2004/0015941 A1 | 1/2004 | Sekine et al. |
| 2004/0024917 A1 | 2/2004 | Kennedy et al. |
| 2004/0025036 A1 | 2/2004 | Balard et al. |
| 2004/0049669 A1 | 3/2004 | Schelling et al. |
| 2004/0071142 A1 | 4/2004 | Moriwaki et al. |
| 2004/0088542 A1 | 5/2004 | Daude et al. |
| 2004/0107256 A1 | 6/2004 | Odenwald et al. |
| 2004/0109443 A1 | 6/2004 | Gai et al. |
| 2004/0117640 A1 | 6/2004 | Chu et al. |
| 2004/0128549 A1 | 7/2004 | Poisner et al. |
| 2004/0158702 A1 | 8/2004 | Tasaki et al. |
| 2004/0162915 A1 | 8/2004 | Caronni et al. |
| 2004/0187103 A1 | 9/2004 | Wickham et al. |
| 2004/0199660 A1 | 10/2004 | Liu et al. |
| 2004/0249974 A1 | 12/2004 | Alkhatib et al. |
| 2004/0255287 A1 | 12/2004 | Zhang et al. |
| 2004/0268339 A1 | 12/2004 | Van Someren et al. |
| 2005/0131997 A1 | 6/2005 | Lewis et al. |
| 2005/0135416 A1 | 6/2005 | Ketchum et al. |
| 2005/0144612 A1 | 6/2005 | Wang et al. |
| 2005/0188102 A1 | 8/2005 | Madajczak et al. |
| 2005/0207421 A1 | 9/2005 | Suzuki |
| 2005/0213603 A1 | 9/2005 | Karighattam et al. |
| 2005/0243834 A1 | 11/2005 | Fukuda et al. |
| 2005/0265351 A1 | 12/2005 | Smith et al. |
| 2006/0004944 A1 | 1/2006 | Vij et al. |
| 2006/0015751 A1 | 1/2006 | Brickell et al. |
| 2006/0026301 A1 | 2/2006 | Maeda et al. |
| 2006/0047938 A1 | 3/2006 | Park et al. |
| 2006/0047942 A1 | 3/2006 | Rothman et al. |
| 2006/0075276 A1 | 4/2006 | Kataria et al. |
| 2006/0075299 A1 | 4/2006 | Chandramouleeswaran et al. |
| 2006/0080522 A1 | 4/2006 | Button et al. |
| 2006/0107071 A1 | 5/2006 | Girish et al. |
| 2006/0136475 A1 | 6/2006 | Karmakar et al. |
| 2006/0143473 A1 | 6/2006 | Kumar |
| 2006/0159088 A1 | 7/2006 | Aghvami et al. |
| 2006/0174109 A1 | 8/2006 | Flynn et al. |
| 2006/0182103 A1 | 8/2006 | Martini et al. |
| 2006/0218390 A1 | 9/2006 | Loughran et al. |
| 2006/0242637 A1 | 10/2006 | Betarbet et al. |
| 2006/0259964 A1 | 11/2006 | Maldonado et al. |
| 2006/0277346 A1 | 12/2006 | Doak et al. |
| 2006/0294305 A1 | 12/2006 | Ballard et al. |
| 2007/0011491 A1 | 1/2007 | Govindarajan et al. |
| 2007/0016781 A1 | 1/2007 | Asokan et al. |
| 2007/0019574 A1 | 1/2007 | Huang et al. |
| 2007/0067617 A1 | 3/2007 | Tarkkala |
| 2007/0136807 A1 | 6/2007 | DeLiberato et al. |
| 2007/0168652 A1 | 7/2007 | Mylly et al. |
| 2007/0201471 A1 | 8/2007 | Sharma et al. |
| 2007/0204257 A1 | 8/2007 | Kinno et al. |
| 2007/0206535 A1 | 9/2007 | Sood et al. |
| 2007/0223483 A1 | 9/2007 | Huang et al. |
| 2007/0226727 A1 | 9/2007 | Yeh et al. |
| 2007/0253387 A1 | 11/2007 | Crampton et al. |
| 2008/0002663 A1 | 1/2008 | Tripathi et al. |
| 2008/0083036 A1 | 4/2008 | Ozzie et al. |
| 2008/0086729 A1 | 4/2008 | Kondoh et al. |
| 2008/0104701 A1 | 5/2008 | Peacock et al. |
| 2008/0126785 A1 | 5/2008 | Chong et al. |
| 2008/0147965 A1 | 6/2008 | Eriksson et al. |
| 2008/0189697 A1 | 8/2008 | Kachroo et al. |
| 2008/0225875 A1 | 9/2008 | Wray et al. |
| 2008/0244553 A1 | 10/2008 | Cromer et al. |
| 2008/0267177 A1 | 10/2008 | Johnson et al. |
| 2008/0295098 A1 | 11/2008 | Cardona et al. |
| 2008/0307229 A1 | 12/2008 | Andersson et al. |
| 2009/0015867 A1 | 1/2009 | Ukegawa et al. |
| 2009/0034431 A1 | 2/2009 | Nagarajan et al. |
| 2009/0077280 A1 | 3/2009 | Anderson et al. |
| 2009/0077634 A1 | 3/2009 | Hung et al. |

(56) References Cited

U.S. PATENT DOCUMENTS

| | | |
|---|---|---|
| 2009/0089764 A1 | 4/2009 | Lai et al. |
| 2009/0094421 A1 | 4/2009 | Lewis |
| 2009/0138875 A1 | 5/2009 | Rothman et al. |
| 2009/0178033 A1 | 7/2009 | Challener et al. |
| 2009/0238209 A1 | 9/2009 | Ju et al. |
| 2009/0249059 A1 | 10/2009 | Asano et al. |
| 2009/0257440 A1 | 10/2009 | Yan et al. |
| 2009/0296571 A1 | 12/2009 | McCourt |
| 2009/0300149 A1 | 12/2009 | Ferris et al. |
| 2009/0327576 A1 | 12/2009 | Oshins et al. |
| 2010/0023777 A1 | 1/2010 | Prevost et al. |
| 2010/0031000 A1 | 2/2010 | Flynn et al. |
| 2010/0049882 A1 | 2/2010 | Tsao et al. |
| 2010/0049900 A1 | 2/2010 | Chiou et al. |
| 2010/0064048 A1 | 3/2010 | Hoggan |
| 2010/0070623 A1 | 3/2010 | Sawada |
| 2010/0088500 A1 | 4/2010 | Ball et al. |
| 2010/0100733 A1 | 4/2010 | Jaber et al. |
| 2010/0107162 A1 | 4/2010 | Edwards et al. |
| 2010/0125856 A1 | 5/2010 | Dash et al. |
| 2010/0128605 A1 | 5/2010 | Chavan et al. |
| 2010/0161737 A1 | 6/2010 | Consul et al. |
| 2010/0185926 A1 | 7/2010 | Lawson et al. |
| 2010/0199078 A1 | 8/2010 | Shih et al. |
| 2010/0217984 A1 | 8/2010 | Hill et al. |
| 2010/0223397 A1 | 9/2010 | Elzur et al. |
| 2010/0232435 A1 | 9/2010 | Jabr et al. |
| 2010/0257523 A1 | 10/2010 | Frank |
| 2010/0262722 A1 | 10/2010 | Vauthier et al. |
| 2010/0266132 A1 | 10/2010 | Bablani et al. |
| 2010/0293289 A1 | 11/2010 | Hsu et al. |
| 2011/0087721 A1 | 4/2011 | Huang et al. |
| 2011/0200057 A1 | 8/2011 | Zhou et al. |
| 2011/0283274 A1 | 11/2011 | Krzyzanowski et al. |
| 2012/0079563 A1 | 3/2012 | Green et al. |
| 2012/0144179 A1 | 6/2012 | Iyigun et al. |
| 2012/0250686 A1 | 10/2012 | Vincent et al. |
| 2013/0031190 A1 | 1/2013 | Chan et al. |
| 2014/0351893 A1 | 11/2014 | Corddry et al. |
| 2015/0139241 A1 | 5/2015 | Vincent et al. |
| 2015/0160948 A1 | 6/2015 | Marr et al. |
| 2015/0199519 A1 | 7/2015 | Marr et al. |

OTHER PUBLICATIONS

U.S. Appl. No. 12/554,777, filed Sep. 4, 2009, Titled: Firmware Updates Inaccessible to Guests.

U.S. Appl. No. 12/555,436 , "Final Office Action", mailed Jul. 25, 2014, 11 pages.

U.S. Appl. No. 12/555,436 , "Final Office Action", mailed Jun. 17, 2013, 14 pages.

U.S. Appl. No. 12/555,436 , "Non-Final Office Action", mailed Feb. 24, 2014, 13 pages.

U.S. Appl. No. 12/555,436 , "Non-Final Office Action", mailed Oct. 16, 2012, 13 pages.

U.S. Appl. No. 12/555,436 , "Notice of Allowance", mailed Nov. 7, 2014, 9 pages.

U.S. Appl. No. 13/539,069, filed Jun. 29, 2012, Titled: Secured Firmware Updates.

U.S. Appl. No. 14/601,004, filed Jan. 20, 2015, Titled: Secure Packet Management for Bare Metal Access, Jan. 20, 2015.

U.S. Appl. No. 14/671,933, filed Mar. 27, 2015, Titled: Managing Firmware Update Attempts.

Abramson et al., "Intel Virtualization Technology for Directed I/O", Intel Technology Journal, vol. 10, Issue 3, (Aug. 10, 2006), 96 pages.

"BIOS Boot Specification", Version 1.01, Compaq Computer Corporation, Phoenix Technologies Ltd., Intel Corporation (Jan. 11, 1996), 46 pages.

"Booting", Wikipedia, Dec. 20, 2008, https://web.archive.org/web/20081220125153/http://en.wikipedia.org/wiki/Booting, 7 pages.

"Hub", Webster's Third New International Dictionary, 1993, 3 pages.

"Preboot Execution Environment (PXE) Specification", version 2.1, Intel Corporation (Sep. 20, 1999), 103 pages.

Viswanathan , "Virtualization with XEN", Trusted Computing CS599, University of Southern California (2007), 21 pages.

\* cited by examiner

FIRMWARE VALIDATION FROM AN EXTERNAL CHANNEL

CROSS-REFERENCE TO RELATED APPLICATIONS

This application is a continuation of U.S. patent application Ser. No. 12/555,436, filed Sep. 8, 2009, entitled "FIRMWARE VALIDATION FROM AN EXTERNAL CHANNEL", and issued to U.S. Pat. No. 8,971,538 on Mar. 3, 2015, the content of which is hereby incorporated by reference in its entirety.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific hardware resources. Such access comes with risks for providers of those resources, however, as in a cloud or other shared environment there typically will be other users sharing those resources at various times, and a modification of the resource by one user can potentially be detrimental to subsequent users. In order to ensure that one user does not alter the hardware configuration, firmware, or software in an inappropriate way that will affect other users, such as by altering firmware to inject malicious code, it can be necessary to re-image the resource after each user. Such an approach might be acceptable in situations where users have dedicated access to a resource for an extended period of time, but in a cloud or similar environment where the user of a resource could change several times over a short period of time, such an approach can be too expensive and resource intensive.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing resources in an electronic environment. In various embodiments, users are provided with full or substantially full or "native" access to one or more hardware resources in a network, cloud, or other shared environment. In other embodiments, users have access to only one or more devices or components, such as a network interface card (NIC) or graphics processing unit (GPU) on a peripheral component interconnect (PCI) bus, on a host machine. In situations where the users having access to such a resource can change frequently, it can be desirable to prevent users from, or substantially minimize an ability of users to, modify firmware or other configuration information for the resource, which can affect an ability of a subsequent user to effectively or securely utilize the resource.

In various embodiments, firmware states can be validated by accessing firmware via a secure channel that is independent of a central processing unit of a host machine. A cryptographic hashing algorithm, or similar process, can be executed on the firmware information, either on the device or using a copy stored in an isolated location, in hardware and/or software, and the results of the hashing can be compared to information stored in a secure location that corresponds to the intended firmware state. If the state information matches, the information for the validation can be logged or otherwise stored to indicate that the firmware is in an intended or approved state. If the state information does not match, at least one remedial action can be taken, such as to notify the user of the state, update the state, or isolate the machine from other resources and/or users.

Figure 1:
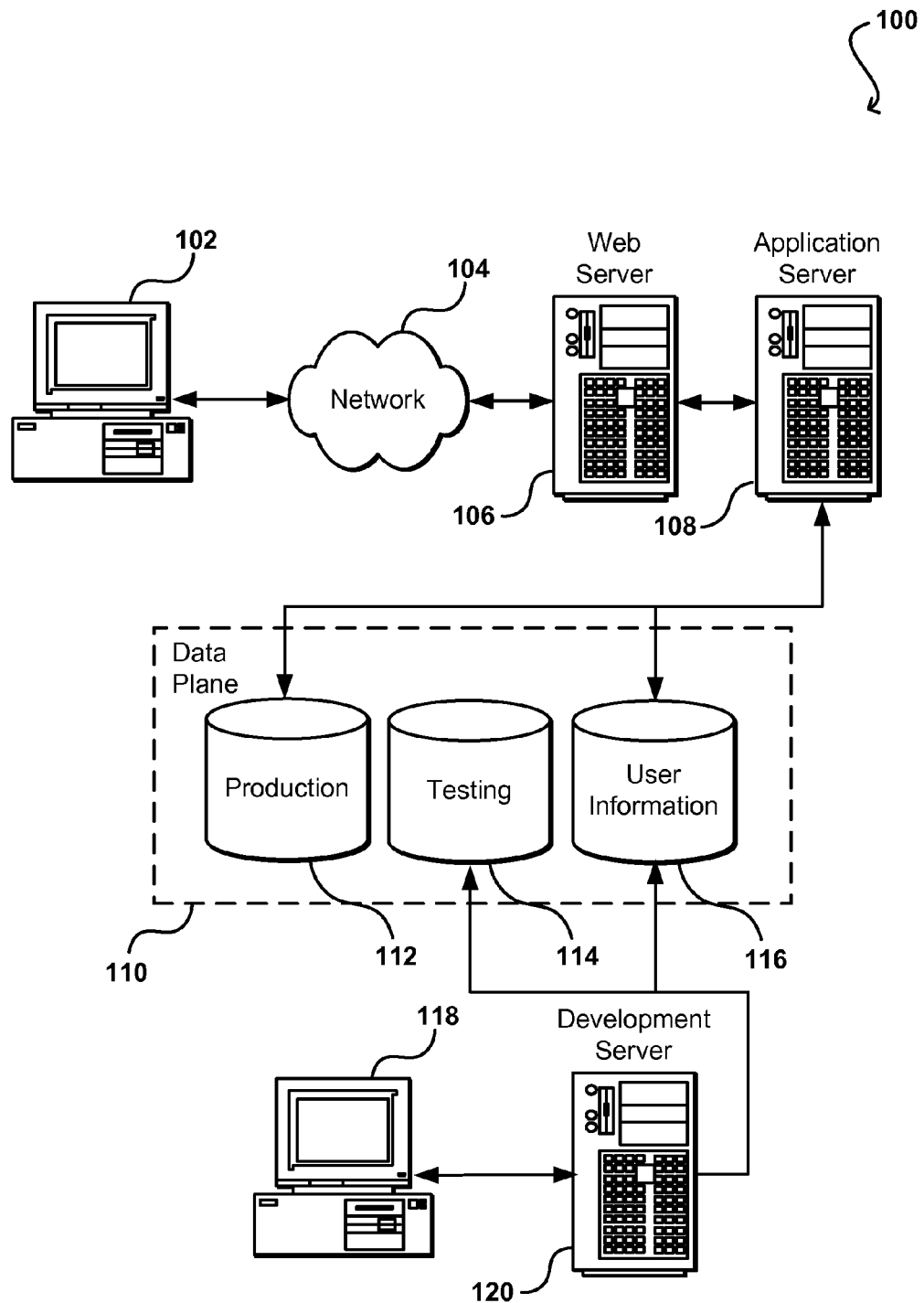
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing testing data 114, which can be used with the user information for the testing side. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 or development server 120, and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide at least one resource access gateway, or control plane, either as part of the data environment or in a path between the user and the data plane, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control plane 208 can be used in some environments to provide and/or manage access to various resources in the data plane 232. In a cloud computing environment, this can correspond to a cloud manager 210 or similar system that manages access to the various resources in the cloud. In one embodiment, a set of application programming interfaces (APIs) 220 or other such interfaces are provided that allow a user or customer to make requests for access to various resources. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

Figure 2:
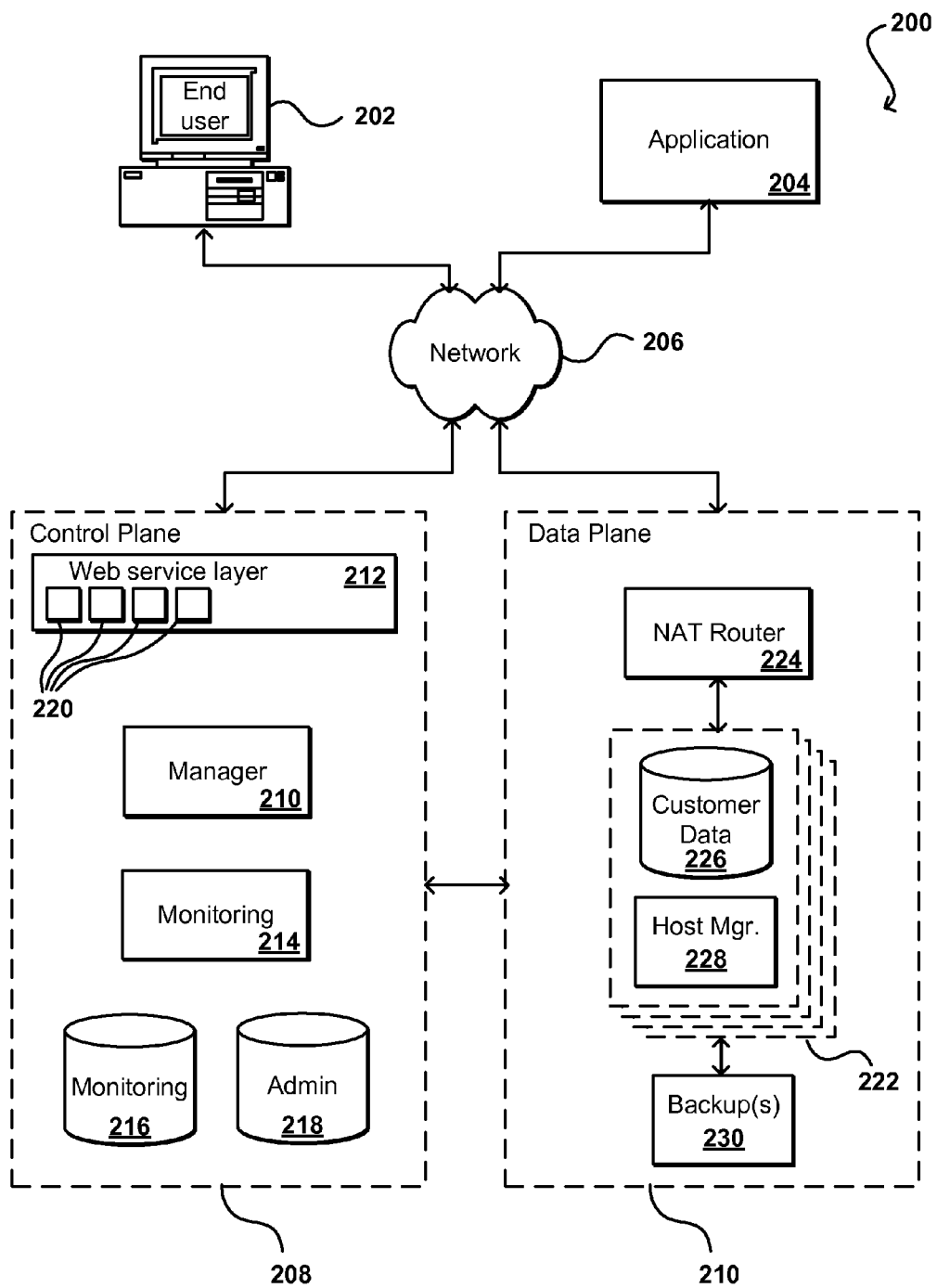
FIG. 2 illustrates an environment for providing access to various resources that can be used in accordance with one embodiment.

FIG. 2 illustrates an example of a configuration 200, such as may include a cloud computing manager system, that can be used in accordance with one embodiment. In this example, a computing device 202 for an end user is shown to be able to make calls through a network 206 to a control plane 208 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs (or other such interfaces) for receiving Web services calls or other such requests from across the network 206, which a Web services layer 212 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane can include one or more resource allocation managers 210, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching a DNS address or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the DNS address and a port address to be used to access a resource. A user then can access the resource directly using the DNS address and port, without having to access or go through the control plane 208.

The control plane 208 in this embodiment also includes at least one monitoring component 214. When a data instance or other resource is allocated, created, or otherwise made available in the data plane, information for the resource can be written to a data store accessible to the control plane, such as a monitoring data store 216. It should be understood that the monitoring data store can be a separate data store or a portion of another data store. A monitoring component 214 can access the information in the monitoring data store 216 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") or similar data store 216, which can store information such as the general allocation granted to a user, throttling or limiting information for a user, resource permissions for a user, or any other such information that can be specified and/or updated by an administrator or other such user.

In an example where users request connections to various data instances, each instance 222 in the data environment can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 210 can communicate periodically with each host manager 228 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 232 through the network using a Java Database Connectivity (JDBC) or other such protocol to directly interact with that resource 222. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 202 or application 204, for example, can be directed to a network address translation (NAT) router 224, or other appropriate component, which can direct the request to the actual resource 222 or host corresponding to the mapped address of the request. Such an approach allows for instances to be dynamically moved, updated, replicated, etc., without requiring the user or application to change the IP address or other address used to access the instance. In some cases, a resource 222 such as a data instance can have at least one backup instance 230 or copy in persistent storage.

As discussed, a resource can be shared among multiple users, clients, applications, etc., either concurrently or at different times, with varying levels of access or allocation. When a user has dedicated access to a machine or resource, the user might also have native or "bare metal" access to the resource for a period of time, depending on the type of access needed, and other such factors. Providing this level of access to a resource comes with potential risks for a provider of the resource, as a user having native access to the device can have the ability to modify firmware or other configuration information for the resource, which can affect the ability of a subsequent user to utilize the resource without first re-imaging or otherwise verifying the state of the resource.

Systems and methods in accordance with various embodiments enable a provider to grant a user or customer with substantially full access to a hardware resource with a reasonable level of security. This native-level access to remote hardware can be provided for resources such as servers, hosts, and cluster instances, for example. For resources such as cluster instances, customers may have native access to a subset of the hardware resources, such as may include peripheral devices connected using a component such as a peripheral component interconnect (PCI) bus. These peripheral devices can include network interface cards (NICs), graphics processing units (GPUs), and similar devices that would often be virtualized in a current cloud environment. In the some cases, a customer might have full access to an entire machine, or groups of machines, including any or all devices incorporated therein. For a group of machines such as a rack of servers, a user might be granted substantially full access to the entire rack, including any switches or other devices or components provided as part of the rack.

Certain providers present such hardware resources as a virtualized abstraction, such that management of the physical hardware can occur in a "more trustworthy" execution context, and can provide additional benefits such as the ability to migrate customers to different resources without interrupting execution and, since customers or "guests" are not tied to specific hardware, the ability for vendors to compete to provide the best utility computing value for price. Also, fewer and more simple guest instance images can be used, as guests do not need a multitude of hardware-specific drivers. Such virtualization can come with potentially significant costs, however, as virtualization can incur order-of-magnitude performance penalties for hardware that does not include native acceleration for virtualization, and virtualization of a particular hardware device can consume substantial resources unrelated to that device (e.g., a processor and/or memory used to virtualize a network interface). Also, virtualization support can lag years behind commodity availability of new hardware (e.g., video cards), and certain appliance hardware is often too specific or "niche" to ever warrant compelling virtualization support. There are potentially large market opportunities in supporting high-margin niche appliances or in being the first-to-market for cloud support of new hardware types. Providing such support through native access, however, can leave vulnerable various aspects of the internal cloud, such as provisioning technology, billing, resource utilization and balancing, and the network layer-2 layout, for example, and can violate threat models well beyond customer requirements.

Systems and methods in accordance with various embodiments can provide for "partial" or "substantially" full access to a resource, such as a host server, by providing users with native access to the host hardware or specific devices, such as cards plugged into a peripheral control bus or similar datapath. In certain embodiments where specific levels of performance are an issue, technology such as an input/output memory management unit (I/O MMU) can be used to "assign" peripheral devices to guest operating systems (e.g., virtualization technology for directed I/O (Intel's VT-D)), effectively giving guests native access to only those peripheral devices. As should be apparent to one of ordinary skill in the art, a guest operating system (OS) can refer to different systems in different embodiments, such as a virtual machine hosting an running OS with at least partial non-virtualized access to some hardware or machine state that the OS or hypervisor depends upon including BIOS, configuration, etc., that is not under the administrative control of the hosting provider. In other embodiments, the guest OS might refer to an OS that is not under the administrative control of the hosting provider running without full virtualization. In one embodiment, an MMU can logically connect a direct memory access (DMA)-capable I/O bus (e.g., a PCI bus) to main memory on a host, and can manage mapping of I/O devices to physical addresses to regulate the flow of information from a guest to various PCI or similar devices. These devices can include, for example, graphics processing unit (GPU) co-processors, high-performance NICs, disk controllers, or other "niche" co-processing devices, such as cryptographic cards or hardware codecs. In some instances, virtualization or other such technology can be used to provide a level of separation between guests and host machines from the central system hardware (e.g., CPU, memory, etc), with native access potentially being available for specific devices on a given host. In other embodiments, native access can be provided to any hardware included in, or available for, a specific host.

One of the main issues with providing customers with native access to specific hardware is that customers may have the ability to modify privileged configuration or BIOS (basic I/O system) settings, or other firmware images on host hardware. These changes can persist across a reboot of the physical system, such that the hardware may not return to the same state that the hardware was in before that customer was granted access to the host or its device(s). In the case of dynamically configurable settings for a virtual machine monitor (VMM) managed by a Ring-1 hypervisor, for example, the changes would in general not persist across reboot, but could persist across instantiations of guest operating systems in a virtualized environment (e.g., chipset settings to support IOMMU technology). This ability for a customer to modify settings or firmware that otherwise should be immutable can have serious security implications. For example, malicious software (e.g., Trojans or viruses) can be inserted into firmware for various devices. Even if firmware changes do not involve intentionally malicious programming, however, the changes still can still be unintentionally damaging by causing performance and/or compatibility issues. Firmware flashing can potentially physically destroy the hardware irreparably (a.k.a. "bricking" the hardware). Certain technologies have been developed that may address at least some of these challenges, particularly for motherboard firmware or chipset configurations. These technologies include, for example, Trusted Platform Module (TPM), LaGrande Technology (LT) from Intel, measured boot technology, trusted boot technology, Dynamic Root of Trust (DRTM), and Static Root of Trust (SRTM) technology. None of these solutions, however, are known to address various issues specific to device firmware, entire hosts, and other such hardware aspects.

Figure 3:
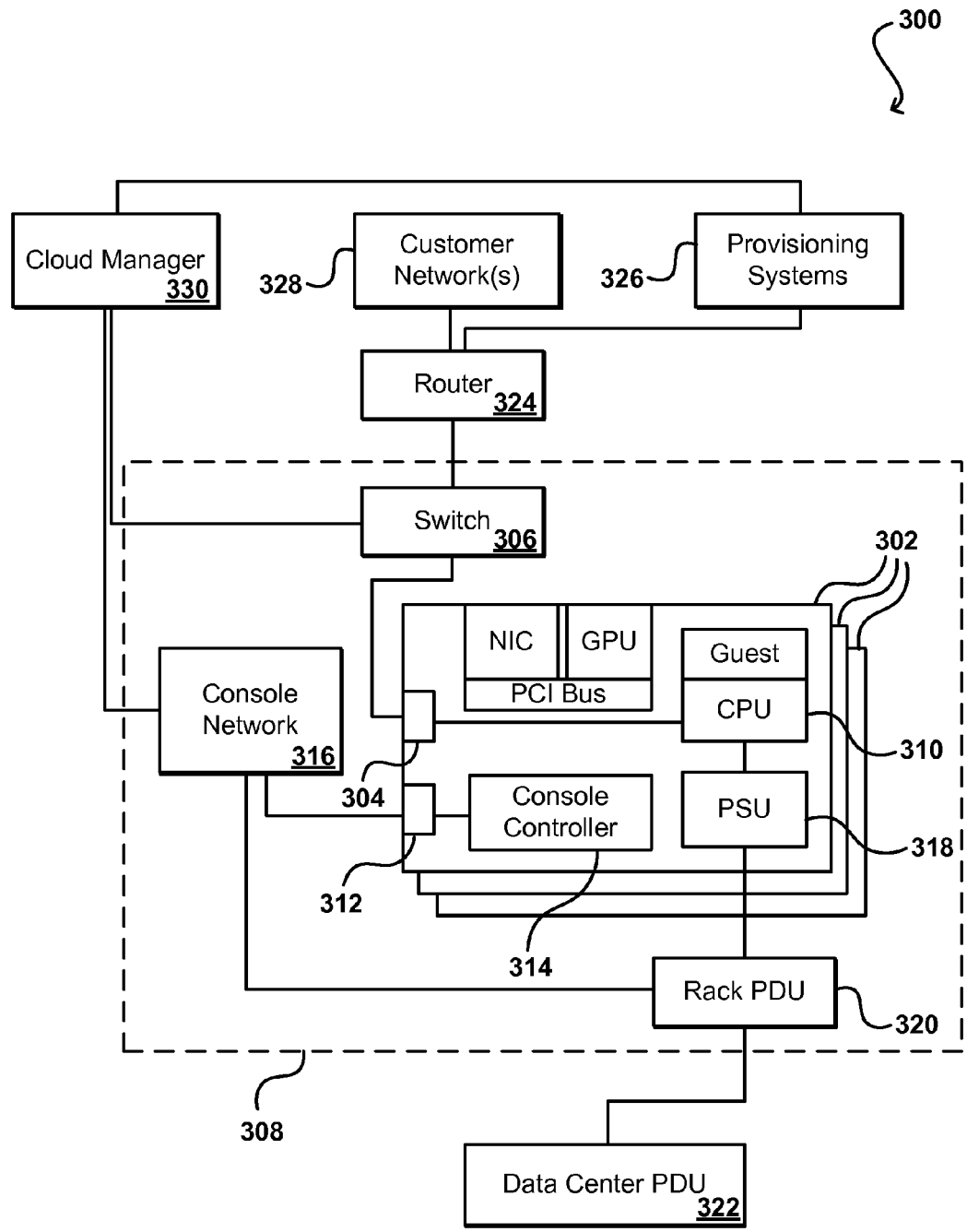
FIG. 3 illustrates a configuration for accessing specific hardware resources that can be used in accordance with one embodiment.

Systems and methods in accordance with various embodiments can prevent the access and/or manipulation of firmware images or configuration information by guests in a cloud or similar electronic environment. In certain embodiments, a customer can be provided with dedicated guest access to a hardware resource for any desired period of time, such as a matter of hours or even minutes. FIG. 3 illustrates an example of a configuration 300 that can be used to provide such native access to a customer in accordance with one embodiment. This example will be discussed with respect to granting a user access to a peripheral device in a host machine using conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 300 includes a set of host devices 302, such as servers or similar devices, that each can have a series of network ports 304. Some of these ports can function as "production" ports which connect each host to at least one network switch 306 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 308, for example. At least one of these network ports 304 can host network traffic for a guest operating system, where the guest is effectively operating "on top of" at least one central processing unit (CPU) 310 in the allocated or partitioned host device (e.g., server) 302 that has access to this production network port. The host device 302 also can have at least one console port 312 and a console controller 314, which can connect to a separate console network 316. This "console network" also can be implemented using the same network technology as the "production network," such as Ethernet technology. In some embodiments, at least some of these ports can be merged but logically separated (e.g., muxed on the same physical port). Each host device also can have one or more dedicated power supply units (PSUs) 318, which can be accessed by the console controller and/or the main CPU, whereby the machine can be powered off via either the host CPU or a device on the network, for example. The power supply for every server in a rack can be connected to a rack power distribution unit (PDU) 320, which can be connected by a higher power cable to one or more data center PDUs 322, each of which can support multiple rack PDUs. In some cases, the hosts 302 can be powered on and off by running a line to the console controller from the rack PDU with relays or other such components to power cycle each device.

At least one router 324 can connect the host devices to one or more provisioning systems 326, and the switch and/or router can manage access to these provisioning systems. In some embodiments, network traffic within a rack is aggregated in order to minimize the number of cables leaving each rack. In some embodiments a capability such as a preboot execution environment (PXE) exists on a host machine 302 at the production network port 304, such that power can be cycled using the console and when the machine boots the PXE code can execute on the network port. PXE access could also be enabled or disabled depending on the type of reboot that has been authorized. For example, reboots could be allowed from local images on the host for customer initiated reboots, but PXE access can be disabled upstream. When the switch 306 is configured to connect a host machine 302 to the provisioning systems, the PXE can connect the device to the provisioning systems and boot the machine into a RAM (random access memory) disk or other block of storage, for example, which enables control operations such as firmware flashing or provisioning of a new customer image. A RAM disk with specialized drivers in one embodiment can be used to boot and/or run an untrusted or unknown image, which might not otherwise be able to boot on a specific machine. Provisioning images thus can be received, over the network to the PXE, which contain provisioning code or firmware flashing code. Once provisioning is completed, authorized customer networks 328 can interact with the devices 302 via the switch 306. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 326, console network 316, and rack components to perform certain actions. The cloud manager 330 can include one or more workflow systems that work with a central database, in one embodiment, to perform various aspects of resource management.

When providing guest access in such an environment, there can be various challenges relating to the secure delivery of customer payloads, as well as the controlling of access to the network and the underlying hardware. On a conventional device with a standard operating system, a user having full access can operate, view, and update the firmware on any device or component in the machine. A modern server can have several embedded processors or similar components that each perform a specific task, and each of these components can have firmware and other configuration information that can be modified. Since devices in a cloud or other shared resource environment can be subsequently provisioned to another user, a guest could perform malicious actions such as injecting firmware in the network card to capture or redirect network packets transmitted for subsequent users of that device. These packets could be sent to any address or party, etc., as set forth in the modified firmware. It thus can be desirable to design or configure I/O devices and other bits of firmware on a machine in such way that, combined with aspects such as time to provisioning, these malicious acts would not be possible, or at least would have very limited attack vectors and vulnerability windows in which to execute them. In some cases, even a completely malicious OS with native access on a host could not inject Trojans or otherwise damage the hardware.

Various systems and methods described herein can attempt to minimize the opportunity for guests with access to a resource to modify the firmware or otherwise modify particular aspects of those resources. In some embodiments, once the operating system or other such software is on a host device, permissions can be set such that users cannot access and/or modify specific aspects of the host, such as the firmware of various devices. Typically, a device will expose certain special calls, ports, address ranges, or interrupt vectors that are used for firmware flashing, and there is some level of control as to whether the device allows those events to occur. Even if ports and events, for example, are exposed to a guest user, various approaches can be used to monitor and/or address specific actions taken by that user.

Figure 4:
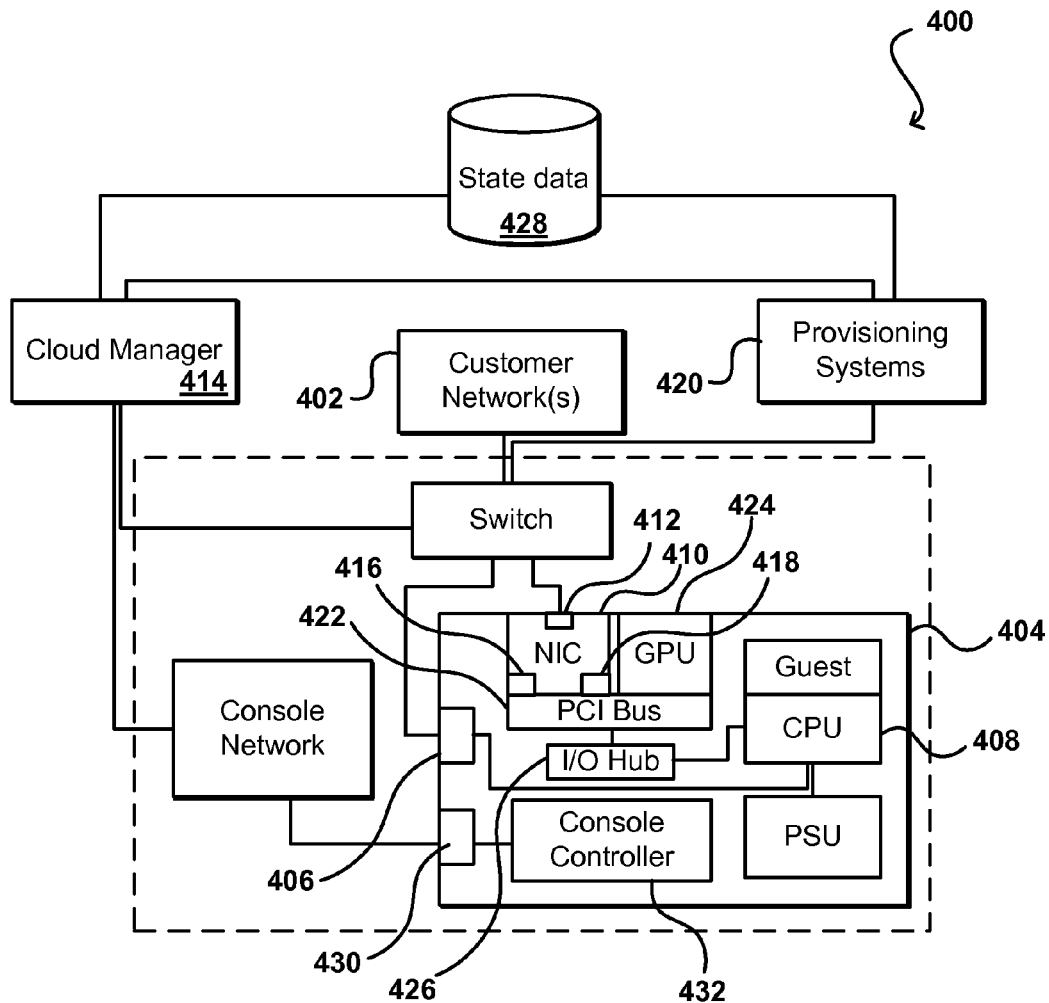
FIG. 4 illustrates a configuration for accessing firmware of hardware resources that can be used in accordance with one embodiment.

In some embodiments, updates to firmware (or other such configuration information) can be protected by only allowing for updates through paths that are inaccessible to guests on a machine even when guests have substantially full access to the host hardware, such as paths that are isolated or otherwise independent of the central computing resources (e.g., the CPU). FIG. 4 illustrates a configuration 400 wherein a customer network 402 (including one or more computing devices) is able to communicate with a hardware device 404, such as a host machine, through a network port 406 of the device. As discussed above, firmware is conventionally updated for such a device by the operating system on the hardware using the CPU 408. Updating the firmware via the CPU is relatively simple to implement, and since in most environments the user owns or has dedicated use of the hardware over a period of time there typically is no reason to prevent a user from updating the firmware when the user has native access to the device. When "renting" a device, or otherwise providing short periods of access to users across a cloud or similar environment, however, there can be many reasons not to trust each user of a device. Even if the user does not intend to do anything malicious, changes to the firmware or other aspects can cause problems with compatibility, performance, etc., as discussed elsewhere herein.

Accordingly, systems and methods in accordance with various embodiments take advantage of the fact that certain network interfaces can be used that are not exposed and/or accessible to a guest user of a the hardware. For example, devices such as network interface cards (NICs) 410 and other peripheral devices can have a separate network communications port 412 that may not be exposed to a guest user of the hardware. A network interface thus can be programmed, configured, and/or manufactured to only enable access to local firmware 418 or other configuration information, such as by utilizing a dedicated network port as an "out-of-band" firmware update port. This update port can be dedicated for access by a control network, for example, such that a guest user can be denied access to the port, and might not even be able to view or detect the port as part of the configuration. Using such an approach, firmware updates and other such processes can be restricted to information received over a port and/or path that is not exposed to guest users. In some embodiments the updates can be received through a console port of the machine, allowing a remote console to manage the firmware of the device, although any other appropriate port can be used where the information can be directed to the appropriate component, and where access by the user can be controlled or restricted. In some cases, a port on a peripheral device such as a NIC or GPU can be used to update firmware throughout the host device 404. Various other network interfaces can be used that are not exposed to, or accessible by, a user, processor, or guest OS of a host machine or hardware device.

Further, it should be understood that the configuration of FIG. 4 is merely an example of one possible configuration, and that many other configurations can be used within the scope of the various embodiments. For example, various types of network interface can be used to perform tasks such as communicating with provisioning systems and providing a secure channel inaccessible to a user of a host machine. For example, an interface can be provided via any component connected to a PCI or other high speed bus, and an interface can exist on a northbridge, southbridge, or other controller hub on a host machine. Further, dedicated network interfaces may be built into a machine or device. There can be multiple I/O hubs or communication paths in some embodiments, while functionality is highly integrated and not provided by discrete components in other embodiments, as various functionality can be delivered "logically" in a number of different ways as known in the art.

In some embodiments, a hardware device such as a host can be configured to boot from the network or from local hard drives, for example. When a firmware update is to be applied to a device, the device can be power cycled or otherwise shut down and restarted. The boot action for that device can be configured to boot from a special RAM disk or other component that applies firmware updates, which can be received over the specified network port of the device. In some embodiments, ports can be effectively "moved" such that the ports can no longer be exposed to the guest operating system, but will only be exposed to a management console, etc. In some embodiments an extra network port and/or bus can be used to allow firmware updates to be sent to the device. In other embodiments, the standard Intelligent Platform Management Interface (IPMI) or a similar interface or protocol can be extended for console management to accept firmware updates, such that an existing console port can be used to receive and apply firmware updates.

In some embodiments, a network interface card (NIC) or other PCI (Peripheral Component Interconnect) device can be utilized that includes a network port that functions as a small embedded computer. Such a device can communicate with other components in the host system, such as by sending messages over a PCI bus or similar communication path(s). In some embodiments the host machine would first be placed in a quiesced state, where only certain administration operations are allowed to execute and other operations are halted. In some embodiments use of a network port for updates can be combined with use of a PCI bus to direct instructions from an alternate source to produce a PCI device that operates as a control plane, or an embedded Linux or similar computing device operating on a PCI card in the host.

In some embodiments, the entire peripheral bus (e.g. PCI bus) can be isolated using the PCI control hub or other chipset to isolate user access to control plane functionality from the CPU.

In other embodiments, as discussed, network interfaces can be exposed through the I/O Control Hub or other I/O chipset that is not necessarily part of the PCI standard and/or not necessarily part of a card-based device. Such an interface can similarly communicate with various components in the host system.

Some embodiments can take advantage of a specialized "immutable" NIC, which cannot be updated from the CPU or host operating system, but only via an external port that is physically part of the device. In the special case of a NIC (or other similar networking device), firmware updates might only be allowed from a network port on the card. From the point of view of the system central computing resources (e.g., the CPU), the device configuration/firmware is therefore immutable. The NIC and other peripheral devices typically have a certain amount of firmware that usually is updatable from the host system, driven by the processor side of a peripheral bus (e.g., a PCI bus). The host can include an input/output (I/O) hub 424, or similar component, that enables communication between the CPU and components attached to the PCI bus 422. The I/O hub or similar component can manage a set of mapped addresses, interrupt vectors, or other communication mechanisms for devices on the PCI bus such that the CPU can communicate directly with those devices. Such a configuration can enable the CPU to communicate over an appropriate channel to send information to a peripheral device to perform tasks such as updating firmware for that device. In this example, however, the I/O hub or the individual peripheral devices can be designed or configured such that the firmware is not updateable from the CPU.

In some embodiments, the peripheral devices can only be updated using commands that come in over a specified port from the network, data center, etc. For chipsets that bridge buses, for example, updates can be configured to only be accepted from the "peripheral" side of the bridge. For example, virtualization technology for directed I/O (Intel's VT-D) configuration changes might be accepted only from the PCI bus side rather than the CPU side. The configuration information could originate from a peripheral device directly connected to the peripheral bus, and the device itself would ideally be "hardened" or "immutable" by central computing resources by ignoring or otherwise not exposing update commands originating from the CPU side of the chipset bridge. If a network manager wants to update the firmware in a GPU, for example, the commands can be received through the network port on the NIC and directed, by the I/O hub, over the peripheral device bus to the GPU. Thus, a firmware updating capability connection between the CPU and at least one peripheral device on the bus is effectively severed. Guests having access to the CPU will not be able to modify the NIC or other such device. The CPU can still communicate with the NIC and other peripheral devices for various purposes, such as using the network device to perform networking operations, but not in a way that allows persistent changes to firmware or other device configuration state.

Figure 5:
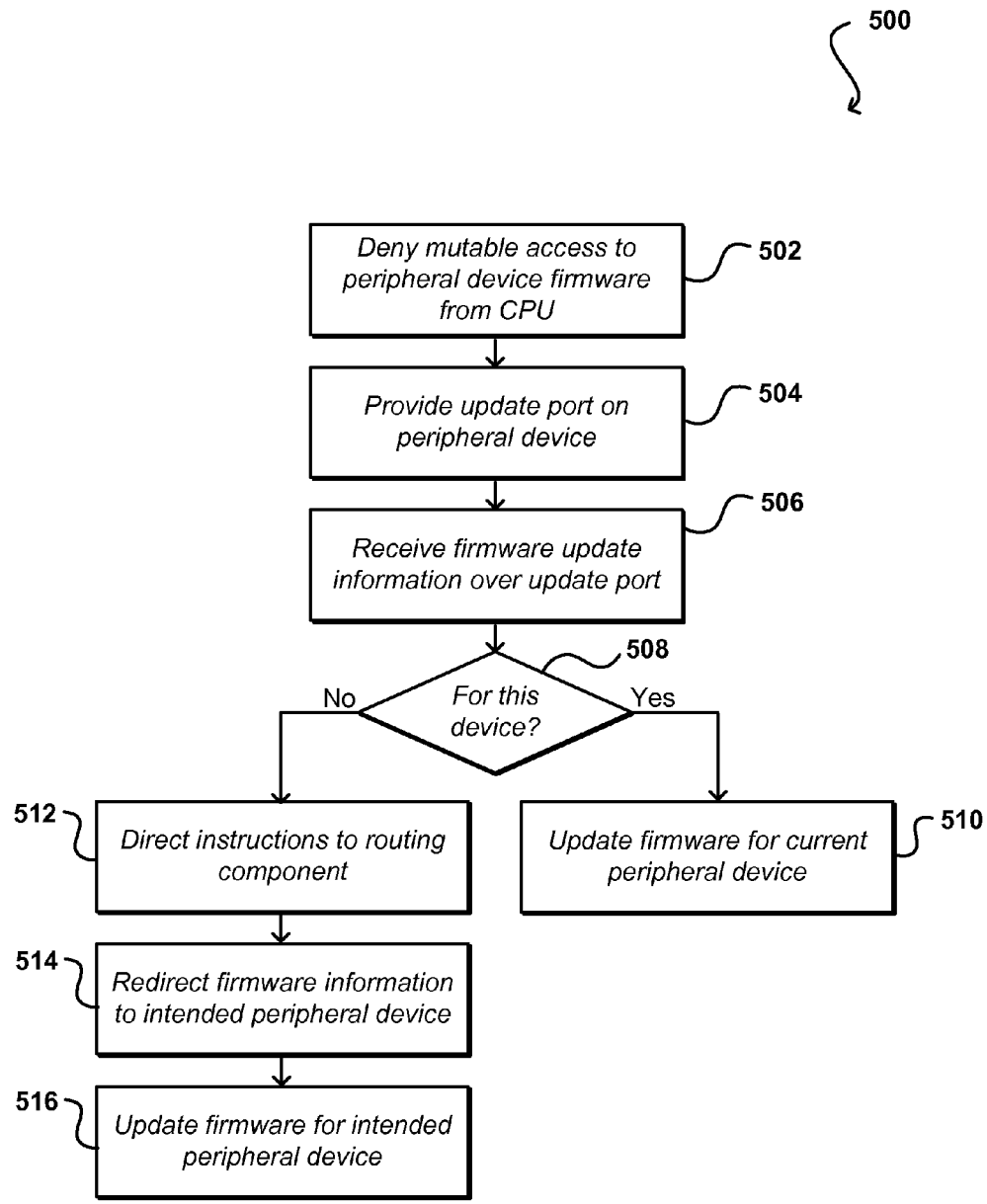
FIG. 5 illustrates an example of a process for updating firmware from an external channel that can be used in accordance with one embodiment.

Commands thus can be received into the NIC over the network port, and peripheral devices on the PCI bus can be configured to accept these commands. FIG. 5 illustrates an example of a process 500 for updating a peripheral device using a network port of a peripheral device such as a NIC. In this example, mutable access to firmware in a device from the CPU is prevented 502, such that a user or guest OS can only access at least certain hardware in an immutable way. In some embodiments, the I/O hub can "sever" the communication channels between the CPU and specific memory addresses or interrupt vectors of the devices on the peripheral plane by not maintaining (or at least not exposing) a mapping between the CPU and the parts of the peripheral devices that are mutable. The CPU thus would never have an image of the mutable region(s) that require secure isolation. At least one network port can be provided on a peripheral device on a host machine 504, which would be able to receive firmware updates (or similar instructions) from a provisioning manager or other such device, system, or service. When an update is to be performed, commands and/or information can be received by an update port of a peripheral device 506. The peripheral device can analyze the instructions to determine whether the updates are for that device, or for another peripheral device on the host, for example 508. If the updates are for that peripheral device, here the NIC for purposes of explanation, a processing component on the NIC can burn the firmware image into the appropriate firmware location on the NIC 510. If the updates are instead for firmware for another device, such as a GPU in this example, the instructions can be directed to a routing component 512, such as an I/O hub for a PCI bus, which can determine that one of the devices on the PCI bus is attempting to communicate with another device on the bus, and can redirect the commands and information 514, such as by using a maintained address mapping. It should be understood that other components for routing communications along other paths in a device or groups of devices can be used as well in various embodiments. Routing decisions can be made based on various policies, including the bus address of the source device making the update request. The instructions can be received by the target component 516, here the GPU, which can burn the firmware image into the appropriate firmware location for the GPU or otherwise make configuration changes. Using such an approach, outside ports can communicate with any components on the external side of the PCI bus via the I/O hub. This communication can allow for the updating of not only firmware, but any configuration or other information on a component in a host device, and can provide a communication path that is not accessible to a guest, CPU, host operating system, or any other component falling outside the update path(s).

In some embodiments a guest user might be granted access to a device using one of a variety of processes for device assignment and/or memory mapping, such as I/O MMU or VT-D technology as discussed above, such that the ability of a guest user to make configuration and/or firmware changes can be blocked by the chipset virtualization technology. Conventional device assignment technology creates a virtual memory map (or other such mapping) between each appropriate device and the guest operating system (OS) address space. Device functionality can be made available to the guest OS by configuring the chipset to translate particular memory address ranges in the guest to accessible addresses on the devices (and vice versa). The guest OS can be prevented from performing actions such as making firmware and/or configuration changes to a device if there is no mapping for those actions, such as a mapping to one or more configurability mechanisms or other such mechanisms that can be used to update firmware or other configuration information. For example, updating firmware for a peripheral device might require mapping between the guest OS and specific memory addresses for the peripheral device. If there is no mapping stored (or exposed) for these memory addresses, then the guest OS cannot access those addresses and thus cannot modify the firmware or other configuration information. A guest OS thus can be granted access to the immutable portions, by exposing mappings to those memory addresses, but denied access to the mutable portions. In some cases this partial mapping not be possible, such as where required guest functionality shares memory address ranges with functionality that needs to be blocked. Specific hardware might need to be selected in various embodiments that allows for separate mapping of these address spaces. In some examples, the guest operating system drivers might create unnecessary dependencies on the address ranges that need to be blocked.

Figure 6:
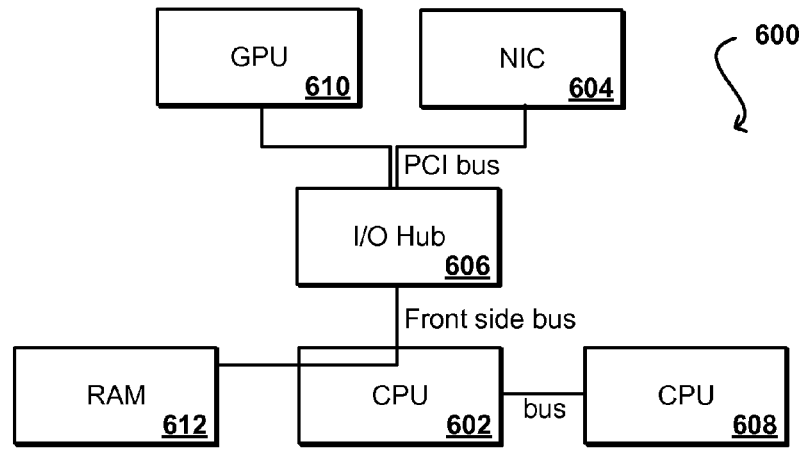
FIG. 6 illustrates an example of a configuration that can be used to map and expose memory addresses in accordance with one embodiment.

In an example using IOMMU or a similar technology, a guest partition can be granted native access to a peripheral device, such as a NIC or GPU. A guest user having an assigned device can get "full" native access in some embodiments. FIG. 6 illustrates some basic components of host hardware 600 for purposes of explanation, but it should be understood that various other components can be used as is known or is subsequently developed for such purposes. A CPU 602 in the host can have a set of reserve memory addresses that are used to interact with any device, such as a NIC 604, connected via a PCI bus or similar connection. Various interrupts also can be used to interact with the NIC in various embodiments. When a device such as a NIC is assigned to a guest partition, a memory mapping is established between the CPU 602 and the NIC device in a secure way, such that the device can only communicate with the main memory that is exposed via the virtual memory mapping. In this example, the NIC communicates with an I/O hub 606 through the PCI bus. The I/O hub can also be connected to a CPU 602, which in turn can be connected to another CPU 608 and other components on the device using an appropriate bus or other connection. The CPU thus communicates with the NIC via the I/O hub 606. The NIC 604, and any other peripheral device 610 having a path via the PCI bus, can transfer information directly from RAM 612 or other memory for the CPU 602 into memory for the peripheral device 604, 610 using DMA (direct memory access) or a similar technology.

The memory address mapping in various embodiments is a direct mapping, such that there can be reserved sections of memory in RAM for the CPU and the peripheral devices that are exposed via the bus. In an environment such as cloud computing, however, there can be differences between virtual addresses for a guest and real or actual addresses of the underlying hardware. An I/O Hub can be programmed to perform a remapping of the addresses, such that instead of pointing to a virtual address page such as 0x0100, the mapping can instead be redirected to a physical memory page such as 0x0200. The mapping thus can direct to a different section of RAM in main memory, which may have been allocated to the guest partition for a particular guest. Memory mappings for separate guests can be separated accordingly. The memory mapping in a table thus can indicate that 0x0100 in virtual memory maps to 0x0200 in real memory, for example. The mapping can also handle interrupts, such that virtual interrupt 16 might map to interrupt 14 on a NIC, for example.

If a guest attempts to update firmware in one embodiment, the update would require a mapping by the I/O hub (or a similar component) to pass information from main memory to the correct memory space on the desired device. In some embodiments, these update attempts can be blocked simply by using mappings or device assignment by the I/O hub to make the firmware on the device unburnable, or otherwise immutable, from the CPU. The device can be assigned and mapped for a specific guest, but the mappings can be controlled such that the guest cannot access the necessary memory space to update the firmware. The I/O hub can effectively segregate memory and/or interrupts, and only maintain or expose certain mappings for the guest. Without a proper mapping, for example, a guest would not be able to call the appropriate interrupt, or fill a register and invoke a function that burns a firmware image into the NIC, etc. Any command requiring the mapping (in either direction) would fail for not being able to access the appropriate memory space. The segmented mapping by the I/O hub can occur without knowledge by the NIC, GPU, CPU, or other such device. In some embodiments, each device might include specific privileged and unprivileged command registers, etc.

Figure 7:
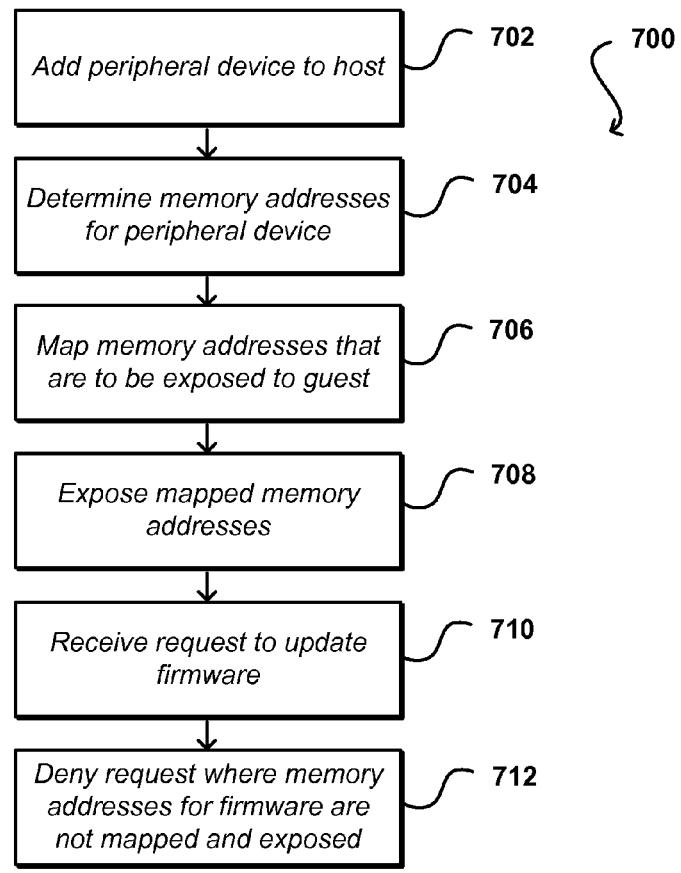
FIG. 7 illustrates an example of a process for mapping memory addresses that can be used in accordance with one embodiment.

FIG. 7 illustrates an example process 700 for preventing mutable access to firmware on a device by a guest on a host machine that can be used in accordance with various embodiments. In this example, a peripheral device is added to a host 702, such as by inserting a NIC into a PCI bus for the host. Memory addresses for the device are determined 704, such as those that are used for immutable access and those that are used for mutable access. Mappings are determined for memory spaces that are to be exposed to the CPU or guest operating system 706, and these mappings are exposed to a user 708. If a request is received from a user to update the firmware for the device 710, the request can be rejected as there is no mapping maintained to the necessary memory space for the device 712.

Additional security measures can be taken in accordance with various embodiments. For example, even in systems where a user or guest operating system is prevented from modifying the firmware or other configuration information for a device, any attempts to update the firmware can be logged, tracked, or otherwise stored for analysis or other such use. In some embodiments, events can be logged such that an administrator can determine which users have attempted to update firmware. In other embodiments, there can be one or more definable actions on an attempted firmware update. Thus, the system can be configured not only to disallow firmware updates, but also to track attempts at updating the firmware. In some cases, a system can be configured to notify a console manager, cloud manager, or other such component upon an update attempt, and can perform a specified action such as to halt the machine or trigger an alarm. In some cases, administrators or other such provider employees can be notified upon an attempted update such that an appropriate action can be taken. Conventional devices provide no real audit trail for attempted updates or updates, at best indicating when the last update occurred and maybe a current version number. Once a machine is flashed and rebooted, any information regarding previous flashing typically is lost. Some conventional systems might maintain a log of flashing events, including information such as time of update, but such systems do not block update attempts as discussed herein or trigger actions based on the update attempts as suggested.

Further, many of the approaches discussed herein can be combined to provide higher levels of security. For example, a secure key can be used with a limited mutability period or updates from an external port. Keys or external ports also can be used where mappings are not maintained for a guest OS. Various other combinations are possible as well, the selection of which can depend upon factors such as the threat model and desired.

In some embodiments guests might be allowed to update firmware, while in other embodiments guests might instead be able to select or determine policies that dictate which firmware versions or updates, offered or approved by the provider, are to be applied to a device at any time for that guest. For example, one guest might select to use firmware versions that have been tested for a long period of time, while other users might prefer firmware that offers improved performance but has not been as thoroughly tested. Various other options can be presented as well. The policies can be determined for the hardware upon startup, such as by contacting a central cloud manager or control plane component. In some cases, the firmware to be applied can be determined dynamically, based upon factors such as the requirements of the guest for the hardware during the provisioned session.

Various mechanisms can be used to monitor the state of the firmware or other configuration information on a device or host machine. One such mechanism is a secure monotonic counter, which can be automatically incremented each time firmware or other such information is updated, with the user being unable to control or modify the count. Use of such a mechanism is described, for example, in co-pending U.S. patent application Ser. No. 12/555,455, filed Sep. 8, 2009, and entitled AWS Bare Metal Instances: Secure Monotonic Counter, which is hereby incorporated herein by reference.

Even when using any of these or other mechanisms to provide a level of control and/or security around access to firmware on a host machine or other such device, it still can be possible for a user provisioned on, or otherwise having access to, the machine to gain access to or otherwise modify the firmware for the host machine or any device thereon. Each type of control provides only a certain level of security, such that it can be desirable in at least some circumstances to verify the state of the firmware for any hardware device that could potentially be accessed by a user, guest operating system (OS), CPU, etc. Certain conventional approaches can send a request to the device to obtain a current version number of the firmware. Such an approach comes with some risk, as it is possible that a user, application, or other source modifying the firmware will ensure that the version number does not change upon modification, such that the firmware will appear as if the firmware is in the desired state based solely upon the version or state information. Further, even if the firmware version or state changes, the request is typically received to the host machine, such that a guest OS, CPU, or other such source can potentially intercept and modify the information that is reported back with regard to the firmware, such that the version or state information can be reported back to be in the previous or expected state, for example.

Further, it is possible that the device originally was obtained with a specific version number, but that the firmware itself was compromised. For example, a manufacturer providing the device can burn a firmware image into the firmware before shipping the device. This may happen multiple times during manufacture, such that when the device is received a provider simply determines the original firmware version number for the device as received and stores that for later verification. If, however, an employee or other source at the manufacturer burns an unapproved firmware image to the firmware for the device, there might be no way to determine, based solely on the version number or state, that the firmware does not represent an approved firmware state.

Systems and methods in accordance with various embodiments can address these and other issues relating to firmware and firmware states by performing validation of the firmware in ways that are substantially independent of components or devices that may be exposed to a user. As discussed above, firmware for devices on a host machine can be updated using one or more external and/or channels, such as an external port of a network interface card (NIC). These external channels also can be used to perform validation of firmware on devices of a host machine.

For example, referring back to FIG. 4, there might be configuration information such as firmware in several locations on a host device, such as the NIC 410 and the GPU 424, as well as for the CPU 408, BIOS, etc. Since components such as the cloud manager 414 and provisioning system(s) 420 are able to communicate with various components through the external or dedicated "out of band" network port 412 or other network interface, these or other components of the cloud or provider network can utilize the same or similar paths to perform validation of the firmware states for at least some of these components. For example, a provisioning system can validate firmware on the NIC by communicating directly with the NIC via an external port 412 on the NIC. A provisioning system also can validate firmware elsewhere on the device, such as on the GPU 424, by sending a request to the external port of the NIC, or other such network interface, which can be routed over a PCI bus 422 to an I/O hub 426, or similar component(s), which can route the request to the GPU 424. A user or guest OS, for example, might have access to update the firmware, but the validation processes can be used to determine whether the firmware is in an approved state. In other cases where the user is not granted access to update the firmware, such as by using a memory address mapping approach described above, such an approach can still be used periodically to ensure that a user or other source was not able to bypass the mapping or otherwise access or modify the firmware. Advantages of various embodiments are obtained at least in part because the firmware validation can be accomplished independent of the central processing unit(s) of the host machine, thereby limiting the ability of a user or guest OS to modify, interrupt, or otherwise affect the validation process.

If it is desired to validate the firmware for the host machine itself, other approaches can be used such as to communicate through a console port 430 that is not exposed to the user. A provisioning device can communicate with a console controller 432 to copy the firmware information to an isolated location and perform a hashing or similar process to be used to validate the firmware state. Any appropriate port and/or component(s) that are not fully exposed to the user can be utilized for such purposes.

A number of approaches can be used to validate the state of firmware using one of the host CPU-independent paths discussed and suggested herein. For example, one or more checksums of a valid firmware state can be determined and stored in a secure location, such as a data store 428 accessible to a provisioning system 428 and/or cloud manager 414 in a cloud environment. At appropriate times, such as at startup, before provisioning a user, or at periodic intervals (e.g., daily or weekly), the firmware running on a device can be analyzed to determine current checksums or hash values for the current state of the firmware, which then can be compared to the values stored in the secure location. In certain embodiments the entire firmware image as deployed in a device is scanned to generate the hash values, checksums, or other validation information, while in other embodiments only specific (or random) portions of the firmware may be scanned in order to reduce the amount of time and resources needed to validate the firmware.

In one embodiment, a provisioning system is configured to periodically scan the entire firmware as deployed in each peripheral device on a host machine. In some cases the firmware is copied to an external location in the cloud for analysis, particularly where the processing power on the peripheral device is minimal. Any appropriate hashing or analysis algorithm can be used as known or hereafter used for such purposes, such as one of the set of Secure Hash Algorithms (SHA) approved by the National Institute of Standards and Technology (NIST) as "cryptographically strong" hash functions, such as SHA-1 or SHA-2 or other algorithms established in the art or subsequently developed for such purposes. In some embodiments, the hashing algorithm can be signed using public key cryptography (e.g., RSA or Elliptic Curve cryptography). The hash values (or digests) generated by the algorithm can be compared to the hash values stored in the secure location, and if the hash values match then the firmware can be determined to be in the desired state. Upon validation, information can be stored to the data store 428, a validation log, or another appropriate location indicating the time and/or result of the validation.

If the currently determined hash values do not match the stored hash values for the intended state of the firmware, any of a number of actions can be taken. In one embodiment, the hash values can be compared to other versions of the firmware to determine if the firmware is running a different version that is approved for the device. If the device is running an incorrect but approved version (e.g., a legacy version), the firmware can be updated to the proper version (e.g., the latest version), such as by using one of the approaches discussed herein. If the device is not running an approved version, for example, then any of a number of actions can be taken to address the potentially compromised firmware. For example, the user of the host device can be notified of the unknown state of the firmware. In other embodiments, the host machine containing the firmware and/or device could be isolated from other network resources to prevent compromised communications or other actions from affecting other devices or users. In other embodiments, the host machine can be instructed to shut down or power can even be removed from the device to ensure that any undesired effects or actions due to the compromised firmware are minimized. In some embodiments a validation of the firmware is performed before the device is added to the network and/or provisioned to a user, in order to ensure that the device is in the desired state even before exposure to a user or other such source. An audit log could also be generated in the event of a mismatch.

In some embodiments, the hardware device can be configured or manufactured to perform a hashing function and provide the hash values independent of a host CPU. For example, the hashing can be an isolated operation that cannot be influenced by any tampering that may have occurred with the firmware, such as by utilizing a non-programmable fixed function built into one or more chipsets. The information for the intended or last known "good" state also can be isolated so that it cannot be modified by a user or guest OS. While this functionality can be substantially blocked from access by a user, however, there is still the potential in some embodiments that a user having access to the device can compromise the information determined and/or reported by the device. For example, if the hashing code is stored in firmware the code could be modified to return the proper hashing codes even when the firmware has changed. Thus, it can be important in at least some embodiments to implement the validation processes in a way that is substantially secure from user modification.

Figure 8:
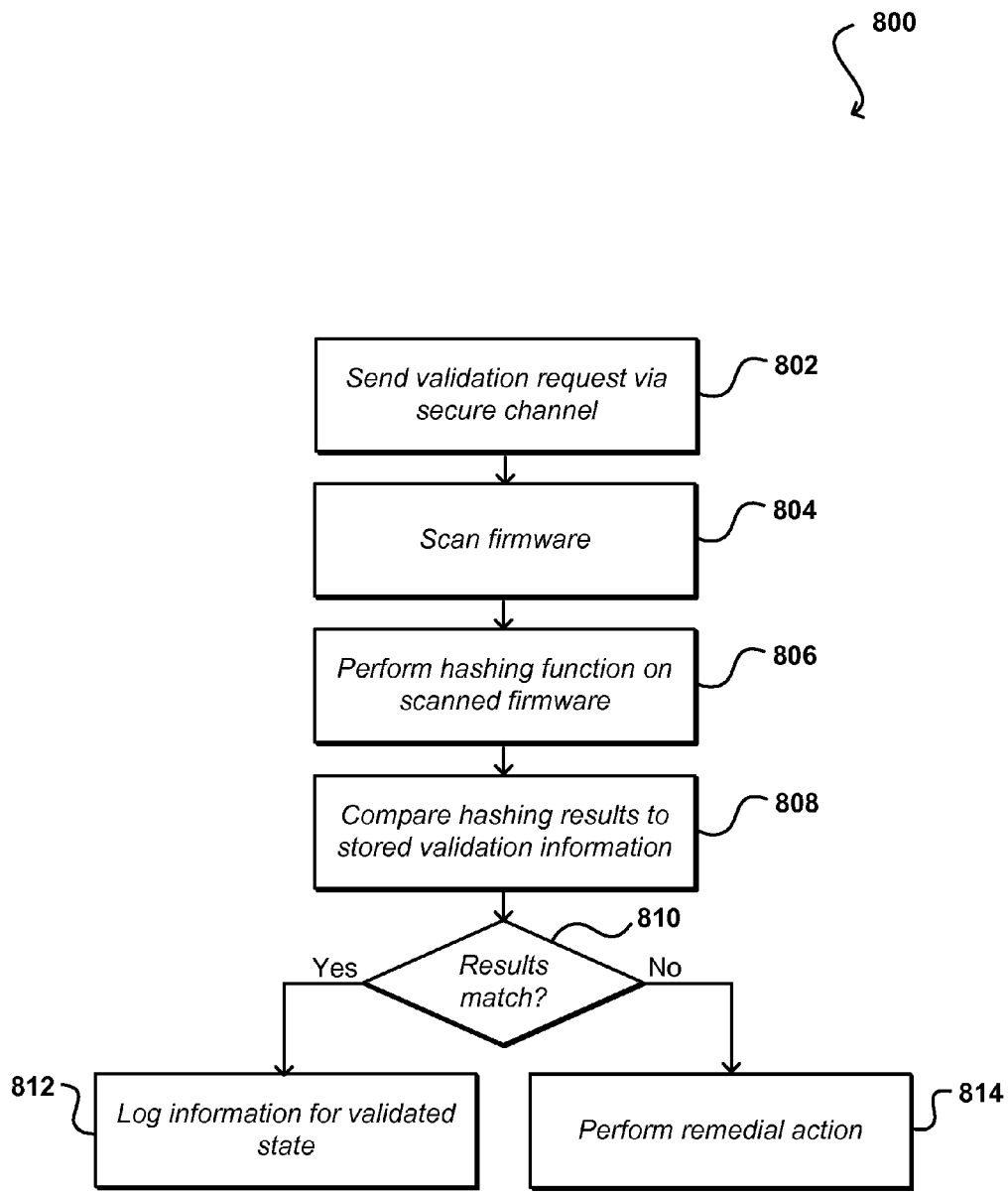
FIG. 8 illustrates an example of a process for validating firmware state(s) that can be used in accordance with one embodiment.

FIG. 8 illustrates an example of a process 800 for validating a firmware state of a device on a provisioned host machine that can be used in accordance with various embodiments. In this example, a request to obtain firmware information can be sent to a port on a host device that is not exposed to a user 802. The firmware can be scanned 804 and a cryptographic hash algorithm or other such algorithm can be utilized to determine hash values or other validation information for the firmware 806. As discussed, the validation can be performed in hardware on the device, in software on the device, by copying the firmware to an isolated location and scanning in this isolated location, or using any other such approach. The validation information can be compared to validation information stored in a secure location 808. A determination can be made as to whether the validation information matches 810. If so, information can be logged or otherwise stored indicating that the state of the firmware has been validated 812. If the information does not match, one or more remedial actions can be taken 814, such as to isolate or remove power from the host machine. It should be apparent, however, that many variations are possible, and that fewer, additional, or alternative steps can be performed in different orders, or in parallel, without the scope of the various embodiments.

In some embodiments, the update channel can be a secure channel that is inaccessible to the user, CPU, guest OS, etc. An advantage to using a secure channel is that the hash values, firmware image, or other secure information does not need to be signed or otherwise secured as in other embodiments. Various lighter-weight algorithms, cryptographic mechanisms, or other such approaches can then be used as should be apparent to one of ordinary skill in the art in light of the teachings and suggestions contained herein.

In some embodiments, a secure path can be used to create a space that is at least partially functionally isolated from the CPU. For example, a secure path can include at least one bus and any selected components directly or indirectly connected to the bus. The isolated space can be considered to be local to the control plane and/or external network, and thus can be externally manageable without being accessible (or at least partially modifiable) by a user or CPU. For example, a PCI bus and any peripheral devices connected thereto could form at least part of the isolated space, and could be managed externally using at least one network interface of the isolated space.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for updating firmware of a device of a host machine independent of user interaction, comprising:

sending, by a computing system, a request to validate firmware information on the host machine based at least in part on a firmware image, the host machine being hosted by a different computing system, the host machine running a guest operating system provisioned to a guest user, the host machine including at least one interface to the device for which the guest user has been granted hardware access, the request being sent to a dedicated network port of a network interface device of the host machine, the dedicated network port being inaccessible to the guest user and reserved for firmware updates;

executing, by the computing system, a hashing algorithm against at least a portion of the firmware image to generate an approved set of hash values;

receiving, by the computing system, a set of hash values that have been signed using public key cryptography;

determining, by the computing system, that the set of hash values does not match the approved set of hash values; and in response to determining that the set of hash values does not match the approved set of hash values, performing, by the computing system, at least one remedial action with respect to the host machine.

2. The computer-implemented method of claim 1, wherein the firmware image is associated with a peripheral device, a particular central processing unit, or a basic input-output system on the host machine.

3. The computer-implemented method of claim 1, wherein the approved set of hash values is stored at a remote location with respect to the host machine.

4. The computer-implemented method of claim 1, wherein the firmware information is associated with a device on the host machine other than the network interface device.

5. The computer-implemented method of claim 1, wherein the remedial action includes at least one of notifying the guest user, isolating the host machine, copying the approved firmware image to the host machine, powering down the host machine, creating an audit log entry, or removing power to the host machine.

6. A system for updating firmware of a device under control of a host machine independent of user interaction, comprising:
   a processor; and
   a memory device including instructions that, when executed by the processor, cause the processor to:
   send a request to validate firmware information on the host machine based at least in part on a firmware image, the host machine hosted by a different computing system, the host machine running a guest operating system provisioned to a guest user, the host machine including at least one interface to the device for which the guest user has been granted hardware access, the request being sent to a dedicated network port of a network interface device of the host machine, the dedicated network port being inaccessible to the guest user and reserved for firmware updates;
   execute a hashing algorithm against at least a portion of the firmware image to generate an approved set of hash values;
   receive a set of hash values that have been signed using public key cryptography;
   determine that the set of hash values does not match the approved set of hash values; and
   in response to determining that the set of hash values does not match the approved set of hash values, perform at least one remedial action with respect to the host machine.

7. The system of claim 6, wherein the host machine includes multiple instances of firmware, at least one of the multiple instances of firmware being outside control of at least one central processing unit of the host machine.

8. The system of claim 6, wherein the firmware information is contained on the network interface device, the network interface device being connected to a bus of the host machine.

9. The system of claim 6, wherein
   the approved set of hash values corresponds to an approved state of the firmware image.

10. The system of claim 9, wherein the approved set of hash values is stored at a location that is inaccessible to at least one central processing unit of the host machine.

11. The system of claim 6, wherein the firmware information is associated with a peripheral device of the host machine.

12. The system of claim 6, wherein the dedicated network port is used solely for firmware updates.

13. A computer readable storage device for updating firmware of a device of a host machine independent of user interaction, the computer readable storage device storing instructions that, when executed by a processor, cause a computing system to, at least:
   send, from the computing system, a request to validate current firmware information on the host machine based at least in part on a firmware image, the host machine being hosted by a different computing system from the computing system, the host machine running a guest operating system provisioned to a guest user, the host machine including at least one interface to a device for which the guest user has been granted hardware access, the request being sent to a dedicated port of a network interface device of the host machine, the network interface device functioning independent of at least one central processing unit of the host machine, the dedicated port being hidden and inaccessible to the guest user of the host machine and reserved for firmware updates;
   execute a hashing algorithm against at least a portion of the firmware image to generate approved firmware information;
   receive a set of hash values, wherein the set of hash values has been signed using public key cryptography;
   validate the current firmware information by comparing the set of hash values to the approved firmware information stored at a secure location inaccessible to the at least one central processing unit of the host machine;
   determine that the set of hash values does not match the approved firmware information; and
   in response to determining the set of hash values does not match the approved firmware information, perform at least one remedial action with respect to the host machine.

14. The computer readable storage device of claim 13, wherein the host machine is provisioned to the guest user by the component of the computing system different from the host machine.

15. The computer readable storage device of claim 13, wherein the guest user has substantially full access to the hardware of the host machine.

16. The computer readable storage device of claim 13, wherein the computing system is a provisioning system of the host machine.

17. The computer readable storage device of claim 13, wherein the secure location inaccessible to the at least one central processing unit of the host machine is located on the host machine.

18. The computer readable storage device of claim 13, wherein the dedicated port comprises an out-of-band firmware update port.

* * * * *